United States Patent [19]

Layotte et al.

[11] Patent Number: 4,505,362

[45] Date of Patent: Mar. 19, 1985

[54] DEVICE FOR AVOIDING MULTIPLE BOUNCES AGAINST A TARGET OF A MASS FALLING THEREON ALONG A RECTILINEAR TRAJECTORY

[75] Inventors: Pierre-Claude Layotte, les Mathes; Jean-Claude Dubois; André James, both of Royan, all of France

[73] Assignee: Institut Francais du Petrole, Rueill-Malmaison, France

[21] Appl. No.: 394,981

[22] Filed: Jul. 2, 1982

[30] Foreign Application Priority Data

Jul. 3, 1981 [FR] France ............................... 81 13298

[51] Int. Cl.³ ..................... B65H 59/10; B60T 11/10; G01N 3/30
[52] U.S. Cl. ........................................ 188/67; 73/12; 188/151 R
[58] Field of Search ................ 188/67, 151 R; 73/11, 73/12, 597, 599, 584; 254/31; 92/16, 22, 24, 27, 28; 74/531, 502, 503; 248/354 H, 354 L, 354 C, 550; 303/18

[56] References Cited

U.S. PATENT DOCUMENTS

| 3,103,116 | 9/1963 | Kohli | 188/67 |
| 3,209,580 | 10/1965 | Colby | 73/12 |
| 3,360,304 | 12/1967 | Adams et al. | 303/18 |
| 3,840,095 | 10/1974 | Matson | 188/151 A |
| 4,022,053 | 5/1977 | Teng et al. | 73/12 |
| 4,333,621 | 6/1982 | Acker | 188/67 |
| 4,359,890 | 11/1982 | Coelus | 73/12 |

FOREIGN PATENT DOCUMENTS

| 1081361 | 12/1954 | France | 188/67 |
| 2398316 | 2/1979 | France | . |
| 0443181 | 12/1974 | U.S.S.R. | 248/354 H |
| 0665229 | 5/1979 | U.S.S.R. | 73/12 |

Primary Examiner—Bruce H. Stoner, Jr.
Assistant Examiner—Robert J. Oberleitner
Attorney, Agent, or Firm—Millen & White

[57] ABSTRACT

Multiple shocks of a vertically falling mass against a target member coupled with the earth are prevented by holding the mass and retaining it above the target member after its first bounce. This retention is accomplished by means of deformable elements laterally pressed against the mass body by jack rods actuated in response to a control signal produced by a sensor at the moment of the first impact of the mass.

15 Claims, 6 Drawing Figures

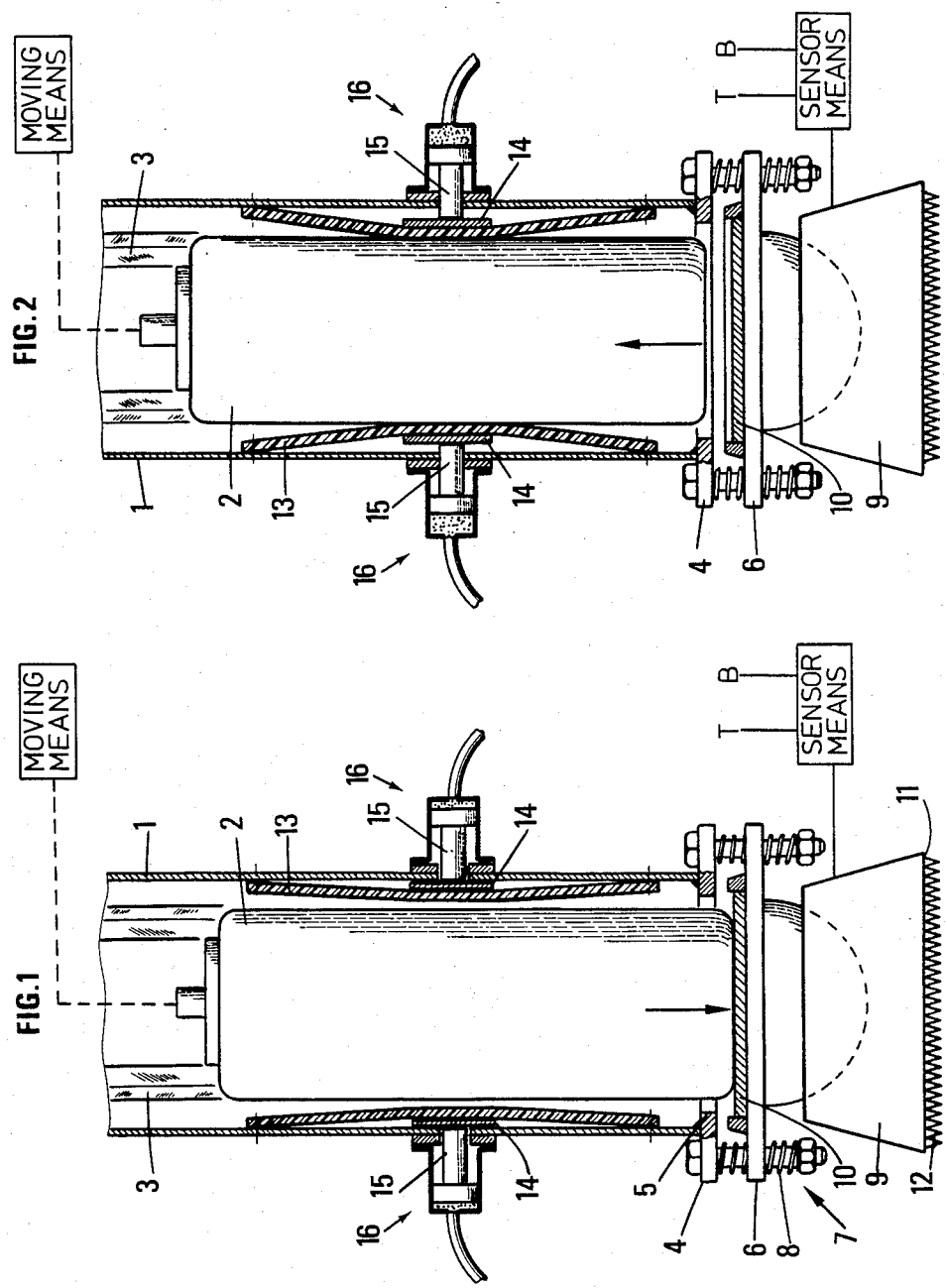

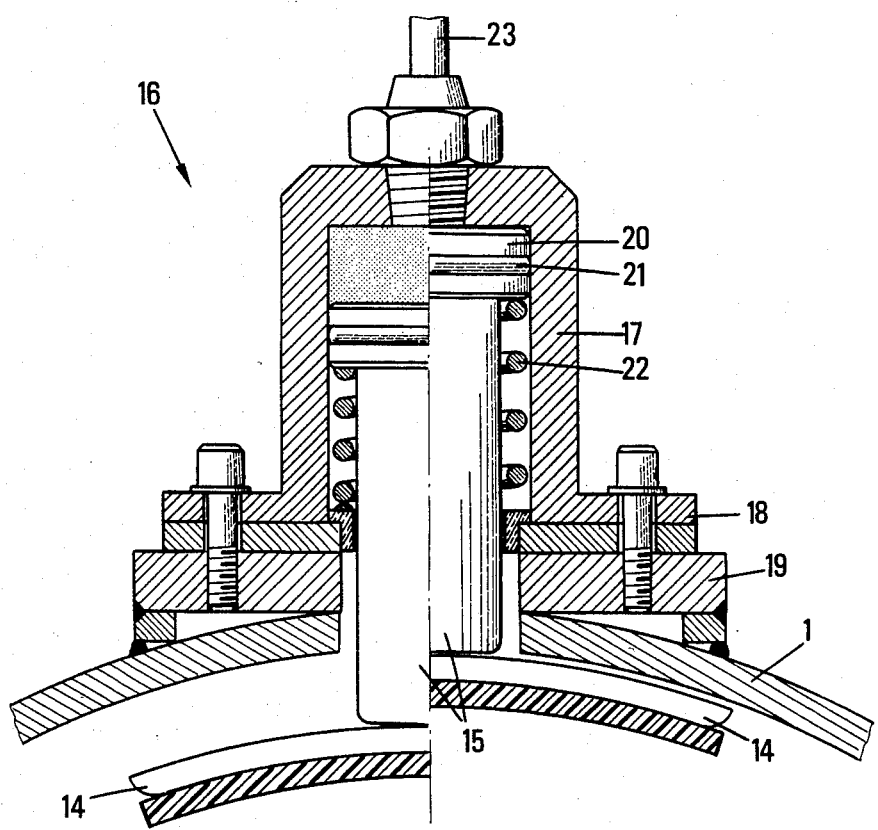

DEVICE FOR AVOIDING MULTIPLE BOUNCES AGAINST A TARGET OF A MASS FALLING THEREON ALONG A RECTILINEAR TRAJECTORY

BACKGROUND OF INVENTION

The present invention has an object to provide a device for avoiding multiple shocks, against a target member, of a weighty mass falling thereon along a rectilinear trajectory. These multiple shocks result because of the bounces of the mass after the first impact.

More precisely, the invention concerns a device for avoiding multiple shocks of a mass associated with guide means and falling along a rectilinear direction towards a target member couple with the earth, as a result of the bounces of the mass after the first impact.

This device may be used, for example, in combination with an apparatus for generating in the earth longitudinal acoustic waves. Such an apparatus is described in French Pat. No. 2,398,316. It essentially comprises a target member secured at a first end of a guide tube forming the guide means and arranged so as to come in contact with the earth when the tube is in a substantially vertical position. A mass is provided adapted to impinge on the target member, and its fall is guided by the guide tube and means for moving said mass to an upper position at the second end of the tube and to maintain it intermittently in said position until the selected triggering times.

This apparatus has the disadvantage of not being provided with means for controlling the free motion of the mass after the first impact, the latter usually effecting multiple bounces of decreasing amplitude, thereby generating multiple shocks on the target member. Multiple secondary impulses are generated in addition to the primary impulse resulting from the first impact, with a disturbing effect on the recordings and result in a lower resolution power of the seismic apparatus.

SUMMARY OF THE INVENTION

The device according to this invention makes it possible to avoid these disadvantages by preventing multiple shocks of the mass after the first impact. For this purpose, it comprises at least one deformable element secured to the guide means, and control means adapted to press the deformable element against the lateral wall of the mass after its bounce and to secure the latter in position. The control means comprises, for example, at least one movable member and driving means connected to the guide means for displacing the movable member in the direction of the lateral wall of the mass.

The movable member preferably consists of the rod of a hydraulic jack which is adapted to press intermittently against a push-plate secured to a deformable element. The control means comprises sensor means adapted to generate a signal in response to the impact of the weight against the target member, the driving means being actuated by said signal.

With such an arrangement, the mass is maintained laterally at the moment of the first bounce and can no longer fall and impinge the target member.

BRIEF DESCRIPTION OF THE DRAWINGS

Other characteristics and advantages will be made apparent from the following description of an embodiment, selected by way of non-limitative illustration and given with reference to the accompanying drawings, wherein:

FIG. 1 diagrammatically shows a cross-section of the lower part of the guide means consisting of a tube associated with the target member, the mass being, at the end of its fall, before its bounce, in contact with the target member, in combination with a first embodiment of the device comprising two deformable elements associated with their respective control means, these deformable elements being in spaced apart relationship;

FIG. 2 diagrammatically shows a cross-section of the lower part of the guide tube associated with the target member, the mass being secured in position, after its first bounce, by means of two deformable elements pressing against its lateral walls;

FIG. 3 diagrammatically shows two juxtaposed half cross-sections of a hydraulic jack for actuating each deformable element, associated with a deformable element provided with its push-plate, the movable member being, in one of the half cross-sections, in position of extension and, in the other, in retracted position;

DETAILED DISCUSSION OF THE INVENTION

The device diagrammatically shown in FIGS. 1 and 2 comprises a guide tube 1 of a diameter larger than that of a cylindrical mass 2 placed inside.

Figure 4:
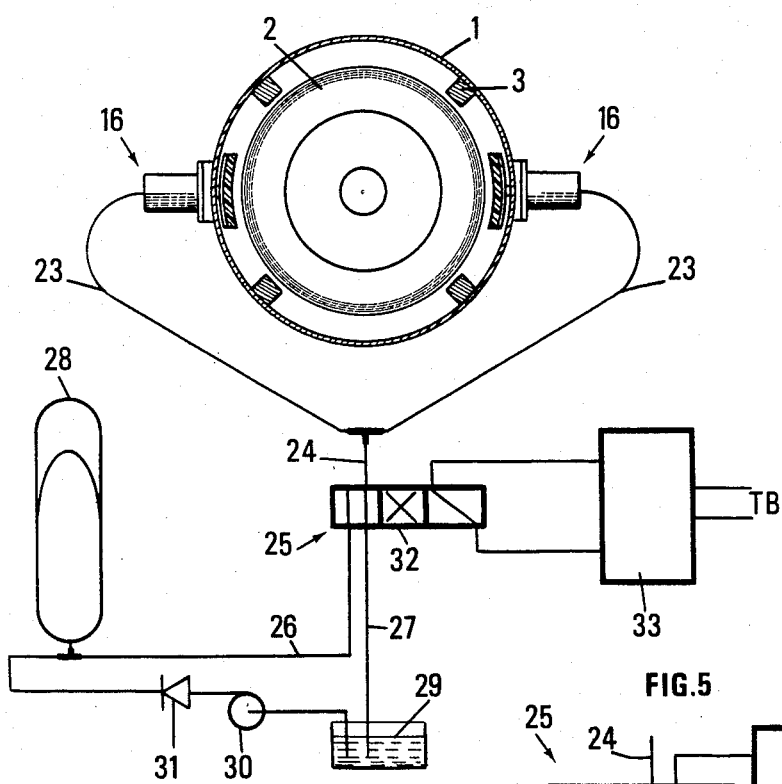
FIG. 4 diagrammatically shows a transverse cross-sectional view of the guide tube and of the device of FIG. 1 associated with a control hydraulic circuit.

Four slides 3, opposite by pairs, are secured along generatrices of the guide tube (FIG. 4). The spacing between the slides is selected so that the mass 2 bears thereon when it moves inside the guide tube 1. At a first end of the latter is secured a first plate 4 whose central portion has an opening 5 of a cross-section larger than that of the mass 2. This first plate is secured to a second plate 6 through deformable fixation means formed of bolts 7 co-operating with springs 8. The second plate 6 is rigidly secured to the target member 9 at its periphery. The latter is provided with a striking plate 10 for the mass and a coupling surface 11 with the earth. The striking plate 10 is made of a dampening material (e.g. polyurethane) which protects the target member and optionally enables to modify the shape of the seismic signal transmitted to the earth.

Protruding elements 12 (teeth or pins, for example) may be optionally secured to the base of the target-member in order to improve its coupling with the earth but, when it must be used on the roads, the target-member is not provided with asperities at its base in order to avoid damaging the road ways.

Two elongate deformable elements, each consisting of a strip 13 of elastic material, for example, are placed between the slides 3 and parallel thereto over two opposite parts of the internal wall of the guide tube, and secured thereto at their both ends. To the medium part of each strip is secured a push-plate 14 on which presses intermittently a movable member associated with driving means, said movable member consisting of the rod 15 of a hydraulic jack 16 which will be described in more detail with reference to FIG. 3. The strips 13 are placed at the lower part of the guide tube 1 so as to face the lateral wall of the mass 2 when the latter bounces after its impact against the target member 9. Means (not shown) are provided to move the mass to the second end of the tube opposite to that at which is secured the target-member. This means may consist, as described in the prior above cited French patent, of an operating system adapted to rock the guide tube in such a manner that its second end will be below its first end, so as to drop the mass by gravity toward its second end where it is intermittently secured in position by means of an electromagnet.

This means may also consist for example of a cable wound on a winch co-operating with driving means, this cable being secured to the mass.

Each of the control jacks 16 (FIG. 3) comprises a body 17 provided with a base plate 18, fixed to a flange 19, rigidly secured to the external wall of the guide tube 1. Openings are provided in the wall of the tube, of flange 19 and of the base plate 18 of each jack body 17 for providing a passage for the rod 15 thereof.

The head 20 of the rods 5 is provided with sealing joints 21 whose section is adapted to the internal section of the jack body 17. A return spring 22, bearing on the head 20 on the one hand, and on a wall of the base plate 18 on the other hand, pushes the rod 15 towards the inside of the jack body 17 (retracted position). The end of the rod 15 penetrating inside the guide tube presses against one of the push plates 14.

The end of the jack body 17 opposite to the base plate 18 is provided with an opening communicating with a hydraulic circuit.

This hydraulic circuit comprises (FIG. 4) two pipes 23 opening at a first end inside bodies 17 of the jacks 16 and communicating at their second end with a common pipe 24 connected to the output of an electro-valve 25 of known type.

Figure 5:
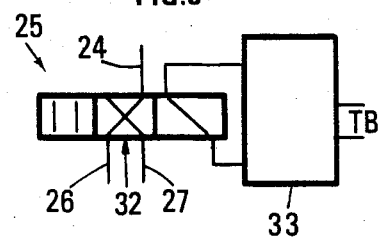
FIG. 5 diagrammatically shows an electro-valve of the control hydraulic circuit in its second position when a control signal is supplied thereto.

The two inputs of said electro-valve respectively communicate through pipes 26 and 27 with a pressurized liquid accumulator tank 28 and a low pressure (atmospheric pressure) liquid tank 29. A pump 30, fed by tank 29, fills the accumlator tank 28 through a flap valve 31. The electro-valve 25 comprises a two-position drawer 32 whereby pipe 24 can be connected to any one of pipes 26 and 27. In a first position of the drawer 32, shown in FIG. 4 (rest position) the valve interconnects pipes 24 and 27 and a pressure equal to the atmospheric pressure is applied to the bodies 17 of jacks 16. In a second position, shown in FIG. 5, after displacement of the drawer 32 the valve interconnects pipes 24 and 26 and the high pressure prevailing in the accumulator tank 28 is applied to jacks 16. The drawer 32 of the valve 25 is displaceable by the action of electro-magnetic means energized through a control box 33, which is actuated by an appropriate signal TB. This signal is generated by sensor means, consisting for example of a geophone placed on the target-member 9 or on the ground at the immediate vicinity of the target-member. It is adapted to detect the seismic impulse transmitted when the mass impinges the target-member, said impulse defining the initial reference time. The jacks 16 and the whole hydraulic circuit from the motor means which, in combination with the movable members adapted to push the deformable elements and with the sensor means, form the control means.

The device operates as follows:

Once the guide tube has been set up to a substantially vertical position, so that the target-member 9 is in contact with the earth and the mass 2 displaced up to the second end of said tube, the triggering is effected at the selected time. The mass 2 falls under the action of its own weight, towards the first end of the guide tube 1, guided by the slides 3. At the end of its stroke it impinges the target-member 9 and, as a result of the shock, bounces in the reverse direction. The valve 32 is then in its rest position wherein the pipes 23 and 24 communicate with pipe 27 and with the low pressure tank 29. The movable member (14, 15) of each jack 16 is in retracted position (right-hand side half cross-section of FIG. 3) and the push-plate 14 is pressed against the inner wall of the guide tube 1. The deformable strips 13 are in released position and their spacing is larger than the diameter of the mass 2.

The sensor means, upon detection of the transmitted impulse defining the instant of the shock, generates a signal TB which actuates the control box 33. The electro-magnetic means of a valve 25 displaces the drawer 32 towards its second position (shown in FIG. 5) wherein the pipe 23 and 24 are in communication with the pipe 26 fed with liquid under pressure from the accumulator tank 28.

The rods 15 of jacks 16 push the push plates 14 secured to the deformable strips towards the inside of the guide tube 1 (left hand-side half cross-section of FIG. 3). The central portions of the deformable strips 13 come closer to each other sufficiently to press with force against the lateral walls of the mass 2 and thus to secure it in position after its bounce (position shown in FIG. 2). The mass cannot fall again and produce parasitic seismic impulses. In addition, the flexibility of the deformable strips 13 enables a progressive braking and secures the mass in position thus avoiding generation of parasitic seismic impulses as in the case of an abrupt locking. This effect is completed by coupling the tube with the target-member through the assembly of suspension springs 8. It can be observed that the mechanical stresses at the locking time are not transmitted to the rods 15 of jacks 16, the latter being not secured to the push-plates 14.

The means for moving the mass towards the second end of the guide tube are then operated and the drawer 32 of the electrovalve is brought back to its first position. The fluid in the bodies 17 of jacks 16 and in pipes 23 and 24 is brought to the low pressure prevailing in the liquid tank 29 and the rods 15 of the jacks are pulled back to their retracted position by the return springs 22. The deformable strips 13 move apart from each other, thus releasing the mass 2.

Figure 6:
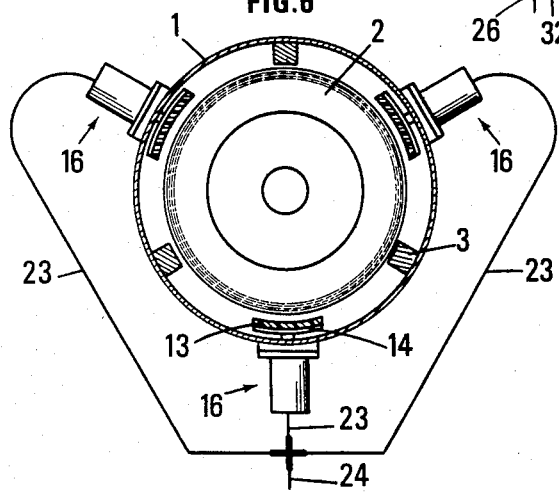
FIG. 6 diagrammatically shows a transverse cross-sectional view of the guide tube associated with an alternative embodiment of the device illustrated in FIG. 1.

According to the embodiment of FIG. 6, the device comprises three jacks placed at 120° from one another and in the same diametral plane of the guide tube, at its lower end, in the manner shown in FIG. 3.

The rods of the jacks 16 are adapted to press against the push-plates 14 secured to the median portions of three deformable strips 13, also placed along the generatices of the tube 1 and secured to the wall thereof at the vicinity of their ends, and are adapted to push the three strips towards the inside of the tube. The mass 2 is guided, in its motion inside the guide tube 1, by three slides 3 placed in the interval between the hydraulic jacks 16, at 120° from one another, and secured to the inner wall of the guide tube over its entire length. The three pipes 23 issued from the jacks 16 are connected to a single pipe 24 fed by a hydraulic system (not shown) identical to that of the embodiment of FIG. 4.

The embodiment of FIG. 6 operates similarly to that described above.

It would not be outside the scope of the invention to replace the jack bodies as well as the hydraulic circuit by any other driving means such as electro-magnetic means.

What is claimed is:

1. In a device for generating seismic waves in the earth by striking a mass having a lateral wall against a target member, the device comprising an elongated guide member having first and second ends, and inside which the mass is guided along inner walls thereof, the target member secured to the first end of said guide member, moving means for moving the mass to the second end of said guide member, retaining means for intermittently retaining said mass in the vicinity of said second end and positioning means for placing the guide member in a position wherein said target member is coupled to the earth and said mass is positioned for dropping towards the target member, the improvement comprising a system for avoiding multiple shocks against said target member produced by resultant bounces of the mass occurring after a first impact on said target member, said system comprising a deformable element secured to the inner walls of the guide member, jack means secured to the guide member for radially forcing the deformable element in the direction of and against a lateral wall of the mass, when said mass is in a position adjacent said deformable element whereby said jack means can be actuated for holding said mass above the target member after the first bounce thereof, sensor means for generating a signal in response to a first impact of the mass against the target member, and control means associated with said sensor means and said jack means for actuating said jack means in response to said signal.

2. A device according to claim 1 wherein said jack means comprises at least one movable member (15) and drive means, connected to the guide member, for displacing the movable member (15) in the direction of the lateral wall of the mass.

3. A device according to claim 2 wherein said drive means comprises at least one hydraulic jack (16) secured to the guide member, the movable member comprising a jack rod and being adapted for pressing intermittently against a push-plate (14) secured to the deformable element.

4. A device according to claim 3, wherein said control means comprises said sensor means adapted for generating a signal in response to the impact of the mass against the target member, and said drive means associated for being actuated by said signal.

5. A device according to claim 4, wherein the drive means comprises a hydraulic circuit co-operating with an electro-valve (25) located for being actuated by said signal.

6. A device according to claim 5, wherein said hydraulic circuit comprises a feed pipe (23) for each jack, communicating through an electro-valve selectively with a low pressure fluid tank (29), or with a high pressure fluid accumulator tank (28) fed with a pump (30).

7. A device according to claim 4, wherein said control means further comprises a circuit for providing fluid under pressure to said jack means, said circuit including an electro-valve actuatable by a signal generated by said control means in response to a signal received from said sensor means, and pressure means comprising a high pressure fluid accumulator tank fed with a pump for supplying pressurized fluid through said electro-valve to said jack means.

8. A device according to claim 3, wherein said guide means comprises a tube (1) of larger cross-section than the cross-section of mass (2), and having a plurality of slides (3) arranged along generatrices of the tube, with the deformable element (13) and the control means secured to the wall of the tube between the slides.

9. The device according to claim 8, wherein the tube (1) is secured at the first end to the target-member (9) through elastic connection means (7, 8) and co-operates with said moving means for moving the mass from the first end to the second end of said tube and for maintaining it in position intermittently.

10. A device according to claim 8, wherein said system further comprises a plurality of deformable elements (13) consisting of elastic strips placed along the generatrices of the tube at the lower end thereof and secured at the vicinity of their ends to the wall of the tube, and a plurality of hydraulic jacks (16) having movable rods, (15), and the hydraulic jacks (16) being secured to the guide tube (1) so that the rods (15) are arranged for pressing against the elastic strips, substantially at the middle of their length, through the intermediary of push-plates.

11. A device according to claim 2, wherein said control means are of the electro-magnetic type.

12. A device according to claim 2, wherein said the deformable element consists of a strip made of flexible material and arranged substantially along the displacement axis of the mass.

13. In a device for generating seismic waves in the earth by striking a mass having a lateral wall against a target member, the device comprising an elongate guide member having first and second ends, and inside which the mass in guided along inner walls thereof, the target member secured to the first end of said guide member, moving means for moving the mass to the second end of said guide member, retaining means for intermittently retaining said mass in the vicinity of said second end and positioning means for placing the guide member in a position wherein said target member is coupled to the earth and said mass is positioned for dropping towards the target member, the improvement comprising a system for avoiding multiple shocks against said target member produced by resultant bounces of the mass occurring after a first impact on said target member, said system comprising at least one strip made of a flexible material, said strip being arranged substantially along the displacement axis of the mass and secured to the inner walls of the guide member and with a push-plate secured to said strip, jack means secured to the guide member and provided with a rod for radially pushing the push-plate whereby said strip can be pressed against the lateral wall of said mass when said mass is in a position adjacent said strip for holding said mass above the target member after the first impact thereof, sensor means for generating a signal in response to the impact of the mass against the target member, and control means associated with said sensor means and said jack means for actuating said jack means in response to said signal.

14. A device according to claim 13, further comprising a plurality of elastic strips placed along generatrices of the tube at the lower end portion thereof, the opposite ends of each elastic strip being secured to the inner wall of the tube, and said sock means comprising a plurality of jacks secured to the guide tube so that their rods respectively press against the elastic strips, substantially at the middle of their length, through the push-plates.

15. A device according to claim 13, wherein the guide member comprises a tube of larger cross-section than the cross-section at the mass, and having a plurality of slides arranged along generatrices of the tube, and wherein the at least one deformable strip and the jack means are secured to the inner wall of the tube between the slides.

* * * * *